United States Patent [19]
Grinnen et al.

[11] Patent Number: 5,169,424
[45] Date of Patent: Dec. 8, 1992

[54] FOREHEARTH STRUCTURE

[76] Inventors: Kent F. Grinnen, 349 Alexander St., Brockway, Pa. 15824; Michael S. Arnold, R.D. #1, Box 258, Falls Creek, Pa. 15840

[21] Appl. No.: 519,733

[22] Filed: May 7, 1990

[51] Int. Cl.$^5$ .......................... C03B 5/235; C03B 7/06
[52] U.S. Cl. ........................................ 65/346; 65/337; 65/356
[58] Field of Search ........................... 65/346, 356, 337

[56] References Cited

U.S. PATENT DOCUMENTS

| | | | |
|---|---|---|---|
| 3,582,310 | 6/1971 | Avery et al. | 65/346 |
| 4,655,812 | 4/1987 | Blumenfeld | 65/346 |
| 4,662,927 | 5/1987 | Blumenfeld | 65/346 |
| 4,680,051 | 7/1987 | Blumenfeld et al. | 65/346 |
| 4,750,928 | 6/1988 | Bolin et al. | 65/346 |

*Primary Examiner*—Joye L. Woodard
*Attorney, Agent, or Firm*—George C. Atwell

[57] ABSTRACT

A forehearth for the conveyance and temperature maintenance of molten glass includes a longitudinal cooling zone over a laterally-extending cooling tile panel which is spaced above and spans an elongated trough supporting the molten glass. Roof structure of the forehearth has a pair of spaced-apart projections jutting downwardly and defining a central cooling area over the molten glass, and the central cooling area is flanked by longitudinally-extending firing chambers. Linear parallel grooves, recessed within at least one broad surface of the cooling tile panel, increase the rate of heat transfer to a longitudinally-extending air flow cavity above the cooling tile panel. The cavity has spaced air inlets along its sides that communicate with the parallel grooves of the panel and direct pressurized cooling air in laterally converging paths through the grooves and thence outwardly through a centrally located exhaust opening. A pair of oppositely-disposed air flow manifolds, located above and outboard the roof structure, are insulated from the heat of the forehearth structure and are adapted to direct the pressurized cooling air to the air inlets. Burner blocks adjacent the oppositely-disposed sidewalls of the trough support specially-configured orifices that downwardly incline from the horizontal and direct high-intensity gas flames to the firing chambers, the molten glass along the trough sidewalls, and also directly against the sidewalls for more efficient heating of the molten glass.

15 Claims, 6 Drawing Sheets

FOREHEARTH STRUCTURE

BACKGROUND OF THE INVENTION

This invention relates generally to glass processing equipment and more particularly pertains to a forehearth furnace for use in glass processing for the purpose of delivering a flow of molten glass from a melting furnace to a spout and thence to subsequent forming equipment.

The typical forehearth furnace comprises an elongated trough for supporting a bed of molten glass. Above the trough is an elaborate roof structure which, in combination with the trough, defines a longitudinal tunnel for processing the molten glass through the forehearth. Such a forehearth includes means for generating heat energy to the molten glass which may comprise a series of gas burners and/or electrodes along the length of the tunnel to directly heat the molten glass in the trough. Such a forehearth further includes a means for removing heat from the molten glass. It is through the appropriate disposition and control of the heating and cooling means that temperature gradients in the molten glass are reduced whereby the desired viscosity and other desired physical and chemical properties of the glass are maintained.

The existence of an extreme temperature gradient between the molten glass along the center line of the forehearth and its outer edges has long been recognized. For well over fifty years the glass industry has been aware that the capability to induce heat energy along the opposite sides and to remove heat energy from the longitudinal center portion of the molten glass in a forehearth is critical in obtaining improved temperature uniformity. U.S. Pat. No. 1,893,061, issued in 1933, teaches the provision of improved means for cooling glass in the longitudinal median portion of a forehearth while applying heat along the side portions of the glass. The foregoing concept was expanded upon in U.S. Pat. No. 3,582,310, issued in 1971, wherein a heating means is arranged longitudinally along the two side portions of the glass, and the glass along the center line of the forehearth is cooled by removing heat radiated upwardly to a roof structure component which is cooled from above by a transverse pressurized air flow. This patent also teaches the concept of heat removal on the underside of the trough by means of a longitudinally-extending duct supporting a flow of pressurized cooling air therethrough.

An improved forehearth construction was thereafter developed, particularly as disclosed in U.S. Pat. No. 3,999,972, issued in 1976, wherein the general tunnel area above the molten glass in the forehearth was separated into a substantially large cooling area directly above the longitudinal center of the glass and oppositely-disposed longitudinally-extending firing chambers or heating areas directly above the side portions of the glass adjacent the longitudinally-extending trough edges. Representative of more recent attempts to further improve the efficiency of heat removal from the longitudinal central portion of the molten glass in a forehearth is the structure disclosed in U.S. Pat. No. 4,552,579, issued in 1985. In this patent, the desirability of eliminating direct contact of the overhead cooling air with the glass stream therebelow is recognized, and provision is made for improved heat-conductive structure between the central cooling area directly above the glass and the longitudinal cooling channel in the roof structure which carries a continuous flow of cooling pressurized air for removing the heat energy and exhausting it to the atmosphere.

Despite the significant advancements introduced by developments in the structure of forehearths, such as those to be found in the aforementioned patents, there remains a need for improving both the efficiency and control of heat energy generation into, and heat energy removal from, the molten glass in a forehearth.

In the current state of the art of glass processing forehearths, operational efficiency has been enhanced by structural compartmentalization which prevents heat-removing air flow from intermixing with the by-products of combustion in the area immediately above the molten glass, and significant efforts have been made to improve the heat transfer from the cooling area immediately above the longitudinal central portion of the glass to an overhead longitudinal air flow cavity.

Insufficient attention, however, has thus far been given to the tendency of known forehearth structures to inherently preheat the air flow which moves through roof cavities to perform its cooling function. Whether the flow of air is longitudinal or transverse, the various components of the entire roof structure are so hot during operation of the forehearth that the incoming pressurized air, meant to pick up heat primarily from the central overhead partition above the molten glass, is preheated from roof component contact. The ability of any given volume of air to accept the transfer of heat energy from the central area is greatly diminished by the already increased temperature of the air volume arriving at the central area.

A collateral heat-conducting problem also exists in current forehearth constructions with regard to the means of generating heat energy into the molten glass at the oppositely-disposed longitudinal trough sides or edges. As with the roof structure, the entire trough and its support structure, regardless of composition, acts as a gigantic heat sink, and much of the heat which passes from the heating means to the molten glass, immediately downwardly adjacent the oppositely-disposed longitudinally-extending firing chambers is immediately dissipated into the trough sidewalls. This is particularly disadvantageous since the goal is to increase, not decrease, the temperature of the side portions of the glass. Improved homogeneity of the temperature of the molten glass can only be attained by cooling the molten glass along the hearth center line and increasing the temperature of the side portions.

SUMMARY OF THE INVENTION

The present invention comprehends an improved forehearth furnace for delivering molten glass to glass-object forming equipment wherein the structure of the forehearth furnace includes an elongated unitary trough supporting a bed of molten glass, and a roof structure spanning the trough and forming, in combination with the trough, an elongated enclosed tunnel. The roof structure is constructed of specially-designed sections or blocks configured and positioned to establish, along the length of the forehearth, one or more cooling zones.

The term "cooling zone" has come to be commonly used in the industry to refer to a section along the length of a forehearth wherein the molten glass is subjected to both heating and cooling means for the purpose of maintaining the glass in the molten condition and controlling its temperature whereby extreme temperature gradients are significantly reduced. The cooling zone of the forehearth, in accordance with the present invention, has, as a consequence of the roof structure formation, a plurality of longitudinally successive spaced-apart cooling areas upwardly adjacent the longitudinal midportion of the glass. Adjacent cooling areas are separated by a refractory barrier, and each cooling area is further defined at its upper end by a relatively thin heat-conductive longitudinally-extending replaceable refractory panel which forms part of the floor of one of several overhead longitudinally-extending air passage cavities.

Each cooling area in the cooling zone is laterally defined by a downward jutting projection of the roof structure, and these projections serve to divide the space directly above the molten glass into three longitudinally-extending space segments, one being a substantially large cooling segment and the other two relatively smaller spacial segments being oppositely disposed and constituting firing chambers directly above the opposite side portions of the glass.

The width of each cooling area is constant from its lower end and up to the aforementioned topside panel, with laterally-disposed sides of the area being defined by vertically-extending surfaces formed in the appropriate block sections constituting the roof structure.

The air passage muffle cavities or chambers extending longitudinally above the series of cooling areas in the cooling zone receive a pressurized flow of cooling air through inlets spaced along their opposite sidewalls, and these inlets are preferably located to emit laterally-converging air streams directly into laterally-extending grooves in the top surface of the aforementioned panel. Each cavity preferably has an exhaust opening, intermediate its length, to vent the converging air streams to the atomsphere, with a spaced suspended refractory block closure above the opening, positionably adjustable relative to the opening, to control the exhaust air flow from the opening.

The forehearth structure of the invention is provided with air flow manifold means preferably comprising a pair of longitudinally-elongated box-like manifold structures, each mounted at an outboard upper edge of the roof structure whereby air flow, which is directed into the two manifold structures from an external source, is emitted centrally inwardly through a plurality of spaced-apart outlets provided along the inside length of each manifold structure. Each manifold structure is extremely well insulated from the refractory constituents of the roof structure, and a longitudinally-extending air flow tunnel is provided in the roof structure, inwardly-adjacent each manifold structure, as a means of further separating the manifold structure from the central air passage cavities. The cavities receive the laterally-directed converging air streams directly from the air flow tunnels interposed between them and the outboard manifold structures.

The means of providing heat energy to the glass in the trough of the forehearth is preferably a series of gas burners disposed along both sides of the cooling zone. The gas burners are located in appropriate openings through burner blocks which unite the trough structure with the roof structure of the forehearth. While it is common practice to provide such gas burners in a forehearth construction for generating a high-intensity flame to the longitudinal side portions of the glass in the trough, the present invention includes the provision of orienting the high-intensity gas flames from the burners such that heat energy is induced directly into the sidewall of the trough as well as the adjacent glass area for reasons hereinafter further described.

Having heretofore generally summarized the structure of the forehearth in accordance with the present invention, it should be understood that it is a primary objective of the invention to provide a forehearth with improved heating and cooling means in the cooling zone section of the forehearth for the purpose of obtaining improved temperature uniformity and homogeneity in the molten glass.

It is a collateral objective of the present invention to provide means for maximizing the temperature differential between the pressurized cooling air stream employed in the forehearth for removing heat energy and the cooling area panels which serve as partitions, and heat radiators separating the cooling air stream from the cooling areas disposed above the glass bed.

It is a further objective of the present invention to provide a forehearth construction with improved means for heating the oppositely-disposed side portions of the molten glass whereby less heat energy input and relatively smaller gas burners are required, thus affording a significant capital investment savings as well as reducing operational cost.

It is also an objective of the present invention to accomplish the aforementioned objectives utilizing structure wherein there is heat transference but no gaseous flow communication between the moving air stream of the forehearth cooling system and the gas burner effluent area whereby the air flow cooling system can be independently controlled and cannot back-pressure the gas burners or effect combustion analysis in the firing chambers.

It is a still further objective of the present invention to provide a forehearth construction having flue passages from the firing chambers which are sized to the burner configurations whereby positive pressure is maintained in the firing chambers, and the need for variable adjustment of the flue exhaust opening from the cooling zone is not required.

Other features, objects, and characteristics of the forehearth of the present invention will be understood and appreciated from the ensuing detailed description of the presently preferred embodiment of the invention, when read with reference to the accompanying drawings.

DETAILED DESCRIPTION OF THE PREFERRED EMBODIMENT

Figure 1:
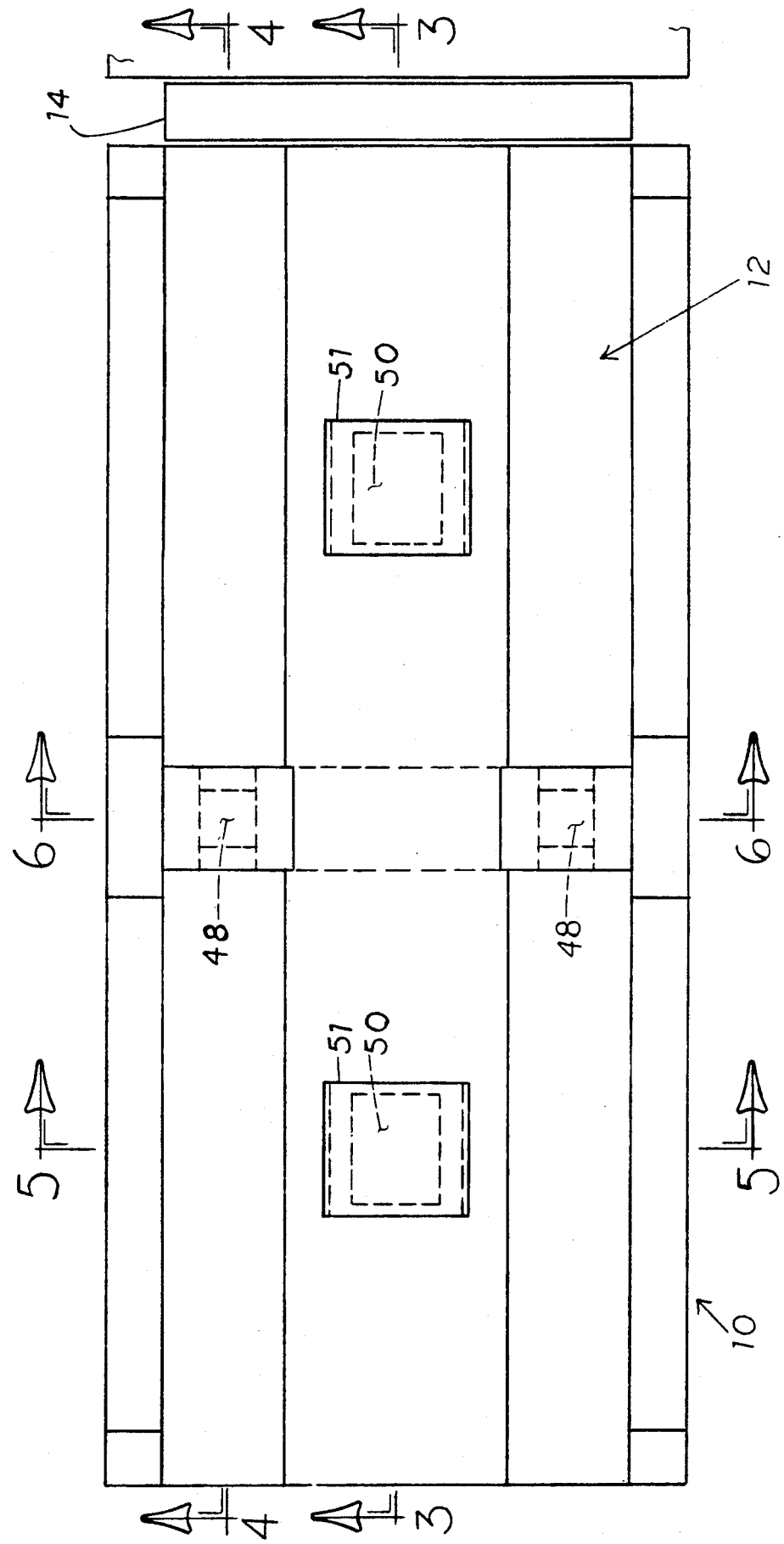
FIG. 1 is a partial top plan view of a forehearth in accordance with the present invention.

Referring to the drawing, FIG. 1 shows the upper roof surface of a glass forehearth furnace 10 which includes a longitudinally-extending rectangular-shaped cooling zone generally designated by the numeral 12. The full longitudinal extension of the cooling zone 12 is defined by solid baffle members 14 at each end thereof, only one of which is shown in FIG. 1.

As shown in FIGS. 3, 4, 5, and 6, the forehearth 10 has a longitudinally-extending trough 16 supporting a bed of molten glass 18 therein. The trough 16 is supported by a substructure 20 which is encased in a steel jacket 22. The trough 16 has a substantially wide floor portion 24 and oppositely-disposed inner sidewall surfaces 26 which project above the top level or upper surface 28 of the molten glass 18 and terminate at respective trough lips 27.

Above the trough 16 and spanning the trough's width is a roof structure denoted generally by the numeral 30. As is typical in forehearth furnace installations, the roof structure 30 is formed in a building block arrangement using solid refractory and insulating block sections having complimentary registering surfaces between adjacent sections which stack and unite to form the whole. Certain blocks or sections are provided with bores or openings therethrough which registerably align with openings in adjacent sections to form passages for special purposes as will be hereinafter described in greater detail. By reference to FIGS. 5 and 6 it will be seen that the roof structure 30 employs a series of elongated laterally-extending refractory blocks 32, each having a length which is substantially identical to the width of the trough 16 therebelow.

Figure 3:
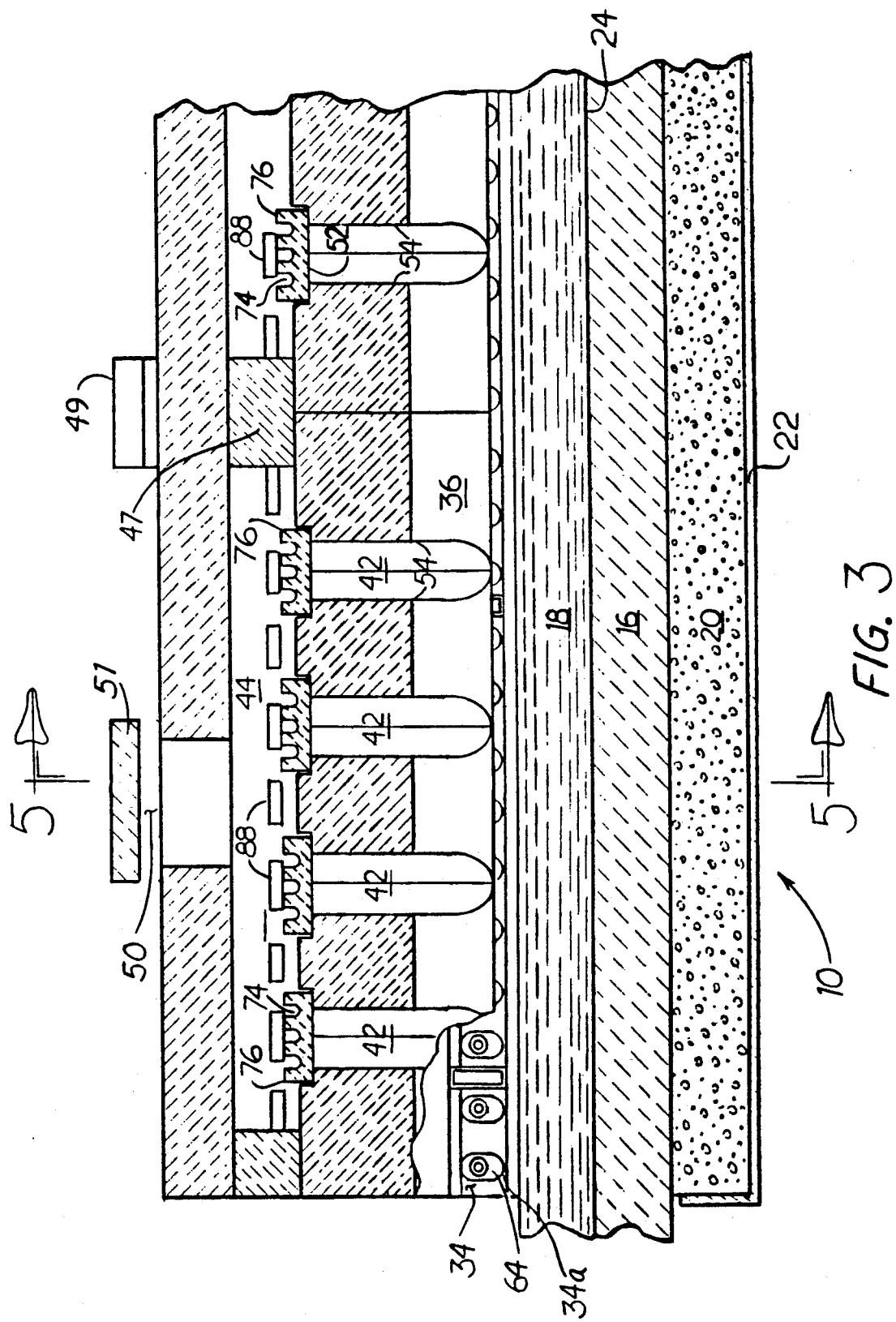
FIG. 3 is a partial longitudinal sectional view taken along line 3—3 of FIG. 1.
Figure 4:
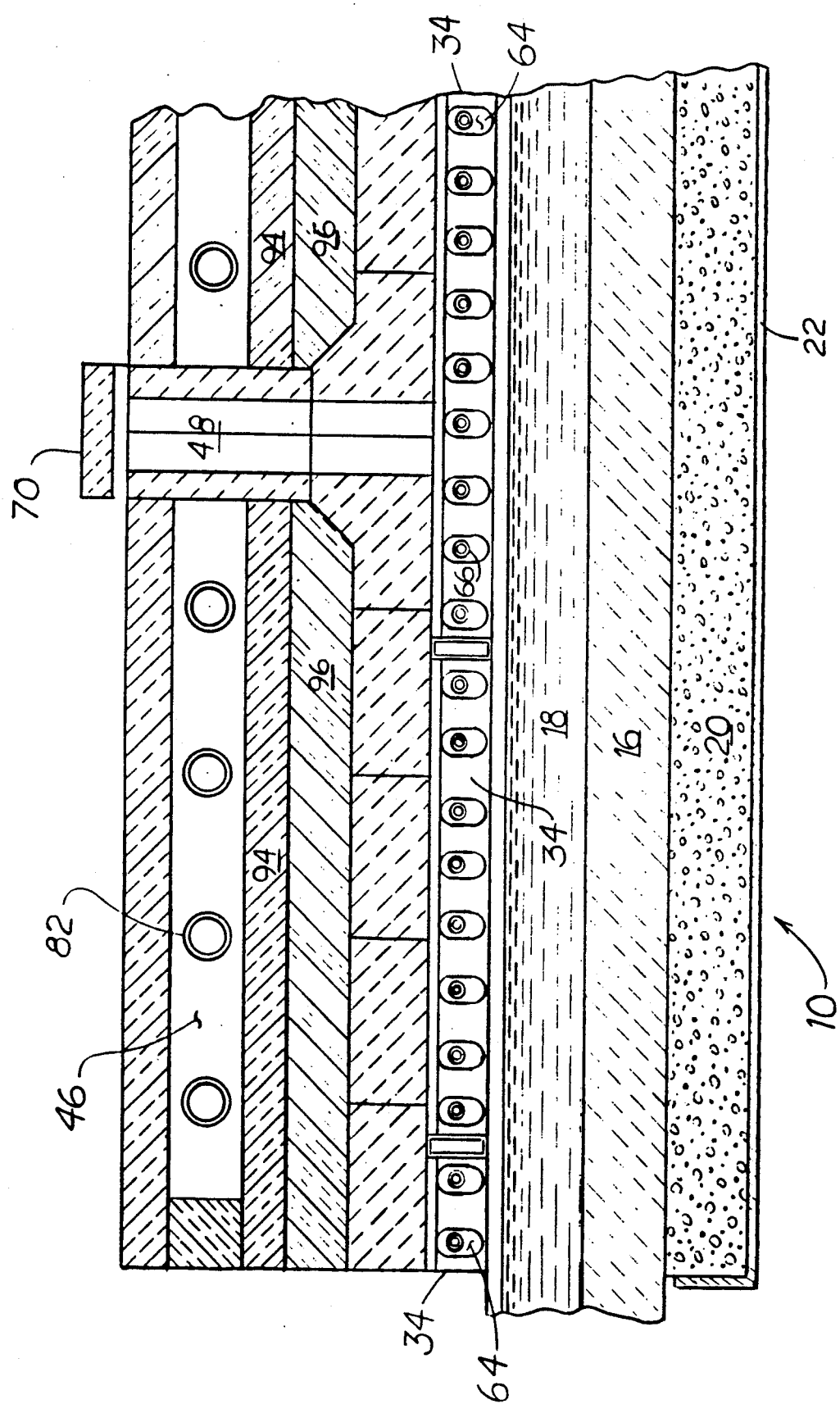
FIG. 4 is a partial longitudinal sectional view taken along line 4—4 of FIG. 1.

Along the flat top surface of each long side of the trough 16 are burner blocks 34 arranged side-by-side to extend longitudinally the full length of the cooling zone 12, as shown in FIG. 4. The burner blocks 34 rest upon both the trough 16 respective top wall surfaces and the respective top wall surfaces of the substructure 20. The roof structure 30 by the shape of the undersurfaces of the refractory blocks 32, define, along with the burner blocks 34, a longitudinally-extending space or tunnel above the top surface 28 of the molten glass 18. This tunnel is generally identified by the numeral 36 in FIGS. 3, 5, and 6. Each block 32 has downward projections 38 serving to compartmentalize the longitudinal tunnel 36 into a central tunnel segment flanked by longitudinally-extending firing chambers 40.

Figure 2:
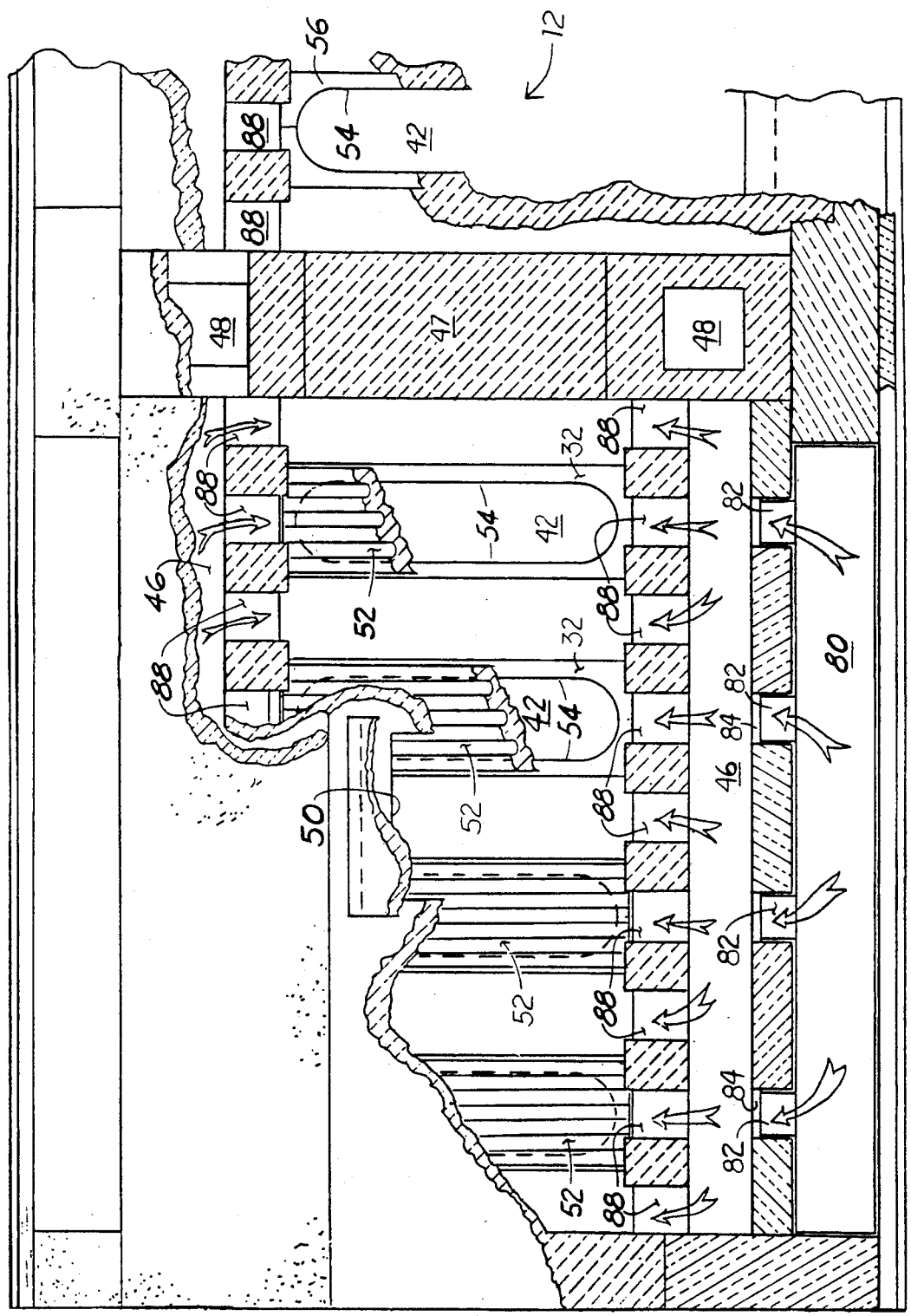
FIG. 2 is a view of the forehearth first shown in FIG. 1, with portions of the upper roof structure cut away to reveal internal details.

The longitudinally-successive blocks 32 are configured and disposed to define a plurality of spaced-apart relatively large spacial openings or cooling areas 42 as shown in FIGS. 2 and 3. The various block sections and insulation blocks utilized in the fitted formation of the roof structure 30 are configured and assembled to define certain longitudinally-extending air flow passages, namely, two longitudinally-successive central substantially wide muffle cavities 44 and a pair of air flow passages 46. The muffle cavities 44 are separated by a barrier block 47. The air flow passages 46 extend substantially the full length of the cooling zone 12, as shown in FIG. 2.

The roof structure 30 further includes certain verticallyoriented openings and passages, including a pair of laterally-spaced flue vents or stacks 48 which are provided intermediate the length of the cooling zone 12, as shown in FIGS. 1, 2, 4, and 6. Cooling air exhaust openings 50 are spaced along and in air flow communication with each of the muffle cavities 44, as shown best in FIGS. 1, 3, and 5.

The floor of each of the muffle cavities 44 is partially defined by longitudinally-spaced cooling tile panels 52, as shown in FIGS. 2 and 3. Each panel 52, which is replaceable, also serves as a lid member for a respective cooling area 42. Each cooling area 42 has an open lower end facing the central upper surface 28 of the molten glass 18 and is further defined by vertically-extending sidewalls 54, each of which terminates upwardly in a peripheral flat top edge or ledge 56 for supporting the associated panel 52.

For ease of understanding the operation of the forehearth 10, it may be considered as utilizing three distinct dynamic sub-systems which are controllably interrelated. These systems may be identified as the heating means, the cooling means, and the effluent exhaust means, the operative structural components of which are disposed substantially above the level of the trough 16 and, for the most part, contained or formed in or on the roof structure 30.

The means for providing heat to the molten glass flow 18 in the trough 16 includes the burner blocks 34 which have lateral bores to accommodate gas burners 60 equidistantly spaced along the full length of the cooling zone 12. Each laterally-extending burner block bore comprises an outwardly-disposed substantially narrow segment 62 which communicates with an inner comparatively larger funnel-like segment 64. Each segment 64 diverges radially outwardly at its inward end. The bore segment 62 is sized and shaped to accommodate insertable securement of a nozzle 66 of a burner 60, and the bore segment 64 serves as a means of spreading and directing the high-intensity flame produced by the gas-air mixture fed therethrough by the burner 60.

It has heretofore been common practice in a forehearth utilizing laterally-inwardly-directed gas burners, to orient each burner either on a horizontal line or on a slightly upward orientation (see, for example, drawing FIG. 3 of U.S. Pat. No. 3,582,310 or drawing FIG. 2 of U.S. Pat. No. 4,069,032) and then appropriately shape the nozzle bore in the burner block, and relative to adjacent block baffling surfaces, to direct the flame over and toward the molten glass surface near the trough sidewall. It is also common practice in current forehearth structures to have the inner surface of each burner block extend at least as far inwardly as the upper lip of the trough and, often, inwardly past the trough lip whereby a portion of the burner block overhangs the surface of the glass in the trough. The adjacent roof component baffling surfaces are then relied upon to direct the heat from the high intensity flame emitted from the burner block downwardly to the molten glass therebelow.

In the forehearth of the present invention, a specific feature of the heating means is the concept of inducing heat energy directly into the trough sidewall structure along both long sides of the trough 16 while heating, at the same time, the portion of the glass immediately adjacent the trough sidewall. This is accomplished by limiting the inward extension of the burner block 34 and preferably angling the block inner face whereby the lower edge 34a of the burner block bottom is set back some distance from the trough lip 27. This heating method provides more uniform heating along the side portions of the glass and affords greater control of the temperature gradients in the glass. The intentional inducement of heat energy into the trough sidewall substantially eliminates temperature differential between the sidewall and the adjacent glass whereby heat transfer from the glass to the sidewall in the sidewall portion adjacent the trough lip 27 is substantially minimized.

Hence, smaller capacity burner units may be utilized resulting in a significant savings in consumed fuel.

Figure 5:
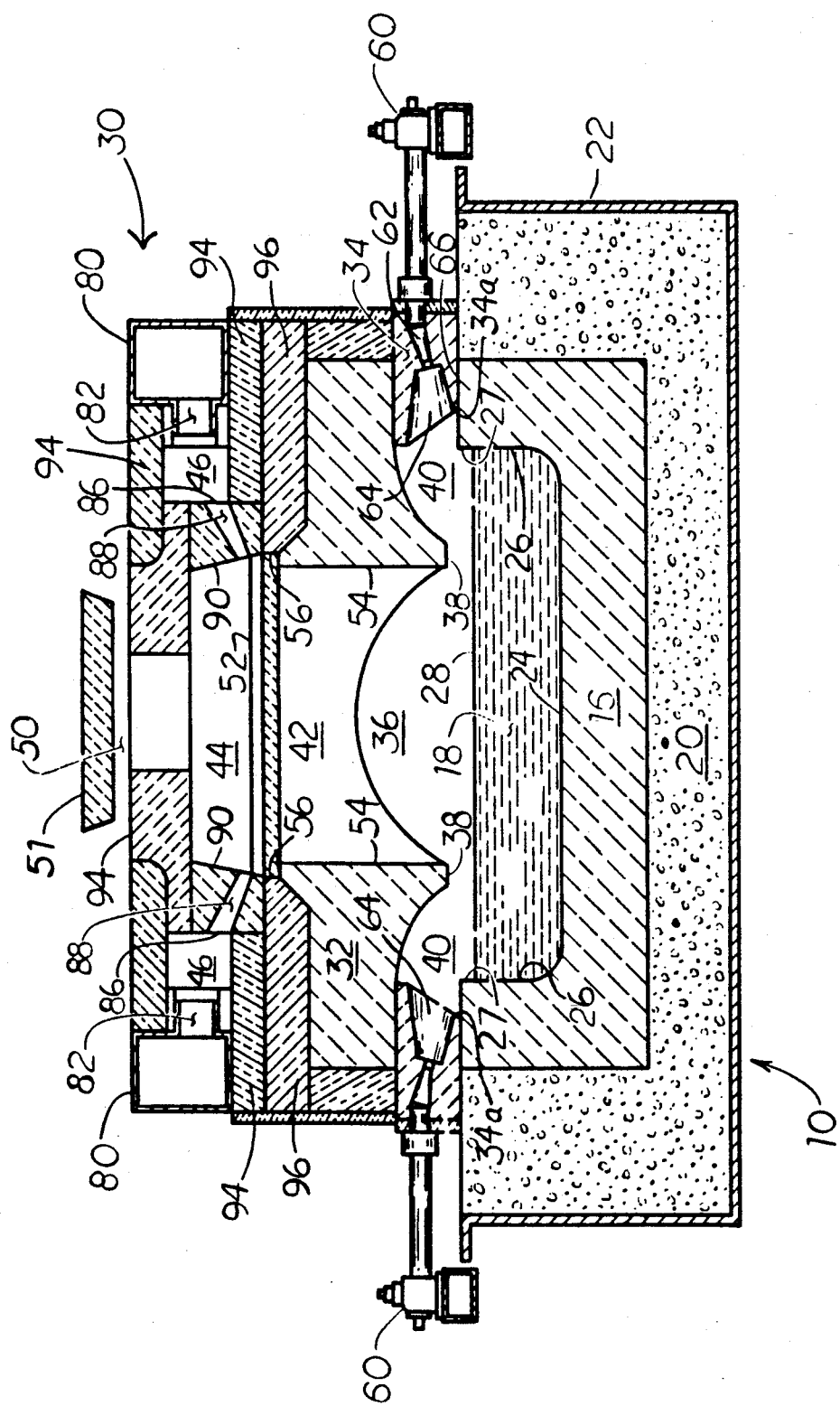
FIG. 5 is a view in vertical cross-section taken along line 5—5 of FIG. 3.
Figure 6:
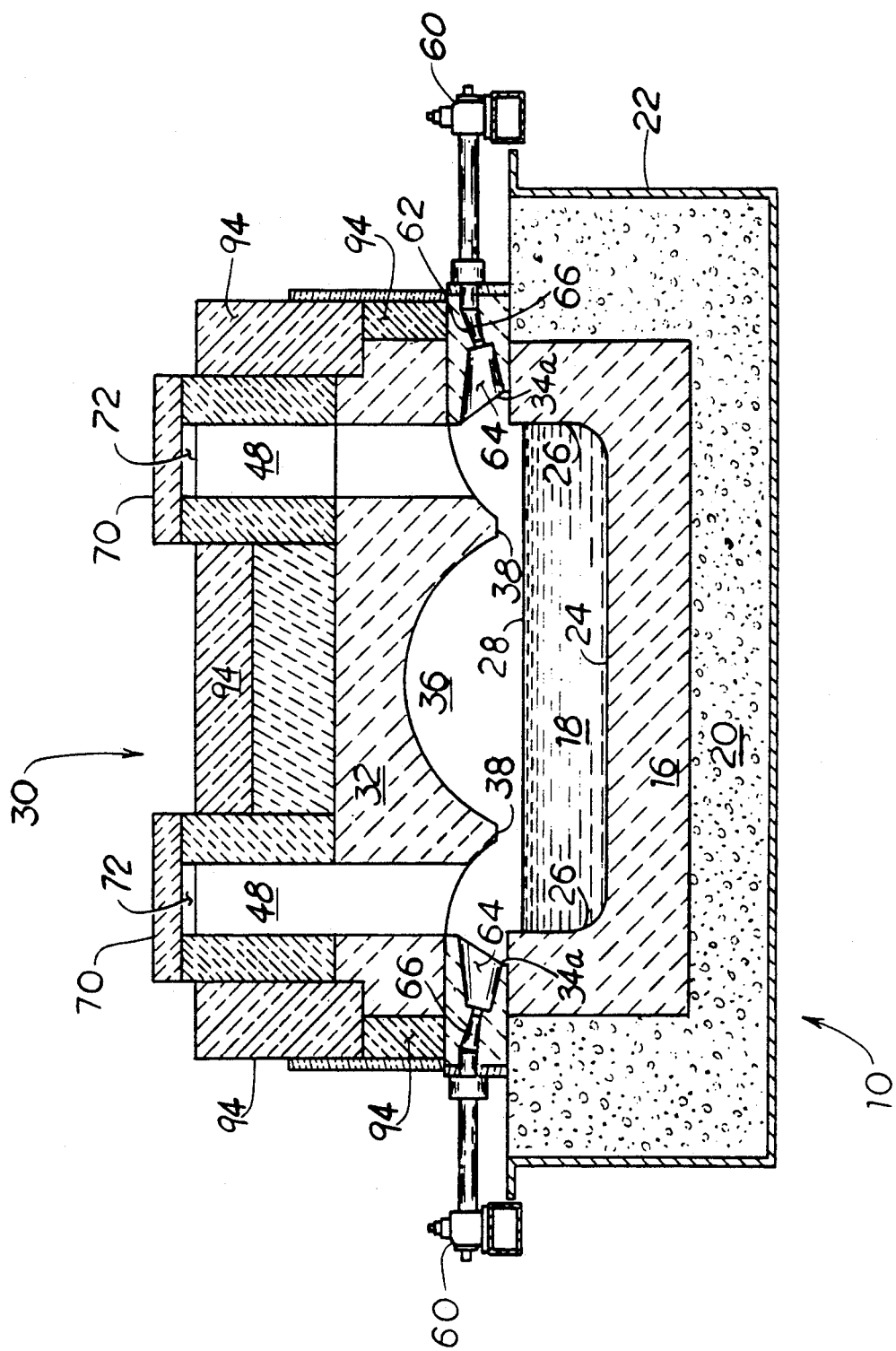
FIG. 6 is a view in vertical cross-section taken along lines 6—6 of FIG. 1.

As shown in FIGS. 5 and 6, it is provided that the nozzle 66 of each burner 60 be angled downwardly from the horizontal and that the lower edge of the diverging bore 64 be disposed well back from the inner upper trough lip 27. The preferred angle of orientation of the nozzle 66 is 10° to horizontal, although the angle may be anywhere within the range of 7° to 13°, depending upon the setback of the lower face end of the bore 64 from the adjacent inward upper lip 27 of the trough 16. By the aforedescribed orientation of the nozzle 66 and bore 64, the centerline of the high-intensity flame produced from the burner 60 is a linear extension of the axis of the nozzle 66.

The effluent exhaust means for the cooling zone 12 of the forehearth 10 includes the vertically-extending flues 48 which, at their lower ends, are in direct flow communication with the firing chambers 40. The upper end of each flue 48 is provided with a damper or cover 70 which is preferably stationarily located on the upper flue end. In the fitting of each cover 70 to the upper end of the flue structure, oppositely-facing exhaust openings 72 are provided for expulsion of the gaseous by-products of combustion to the atmosphere, and the area of each exhaust opening 72 is predetermined, in accordance with the configuration of the flues 48 and the burner assembly characteristics, to maintain a constant positive pressure in the tunnel area 36.

The specific cooling means in the cooling zone 12 of the forehearth 10 includes the longitudinally-successive cooling areas 42 which enable the heat energy radiated upwardly from the central portion of the molten glass flow to be concentrated into the heat conductive cooling tile panels 52. Each panel 52 serves as a heat sink to absorb the excessive heat radiated from the central portion of the glass and to conductively transfer the heat energy to a pressurized cooling air flow moving through the muffle cavities 44. While each of the panels 52 could be of rectilinear configuration, with both upper and lower surfaces flat and co-planar, it is preferred to increase the area of heat transfer from the panel by the provision of surface grooves 74 which create upwardly-projecting ridges 76. The use of surface corrugations or other means of increasing the surface area for improved heat transfer is a generally known concept and has been heretofore used to advantage in forehearth furnace constructions and elsewhere. A highly efficient improvement to this concept, however, is provided in the present invention wherein pressurized cooling air streams are purposely laterally directed into each end of the grooves 74 and across the ridges 76 to significantly increase the rate of heat transfer from the panel to the moving air flow.

The air flow system provided for the cooling zone 12 further includes an outboard manifold means for distributing pressurized cooling air through the roof structure. Referring to FIG. 5, a pair of oppositely-disposed longitudinally-extending box-like manifolds 80 are mounted outboard the roof structure 30 to receive a pressurized high volume air flow from remotely situated air supply equipment (not shown). Each manifold 80 has a plurality of spaced tubular outlets 82 which sealably register in complimentary air flow communication with spaced input apertures 84 provided in the outer sidewall along the length of tunnels or air passages 46. Inward sidewalls of passages 46 are provided with longitudinally-spaced outlet slots 86 which are in sealed air flow communication with respective bores 88 provided through roof block elements 90. The bores 88 are preferably rectangular in cross-section to registerably mate with the output slots 86 and are angled downwardly toward the respective ends of the grooves 74 and ridges 76 of the panels 52 (see FIG. 5).

Significantly improved efficiecy of the cooling means or system of the forehearth structure of the present invention is obtained by a number of design concepts incorporated into or relating to the roof structure 30. One such concept is the provision of a substantially wide and unimpeded cooling area directly above the molten glass flow. The high thermal conductivity panel 52 has a length equivalent to the transverse dimension of the central portion of the molten glass flow from which heat is to be removed directly below the panel. Defining each cooling area 42 are the vertical sidewalls 54 which form an unimpeded uniformly wide heat transfer chamber which does not converge upwardly-inwardly to a relatively narrow heat transfer block as heretofore more commonly used in the prior art. Provision is made to avoid unnecessary preheating of the cooling air flow moved through the roof structure whereby a significantly high temperature differential is maintained between the areas directly above and below the panel 52.

Structure defining the several air flow delivery passages is insulated to reduce preheating of the incoming cooling air flow before it reaches the muffle cavity 44 such that the rate of heat removal is quite enhanced. In this regard, it should be noted that the outboard air flow manifolds 80 are insulated from the refractory elements 96 of the roof structure by relatively non-heat-conductive rigid insulation elements 94 and are spaced from the muffle cavities 44 by the intervening longitudinal air passages 46 which, except for their inward sides, are also insulated from the refractory elements of the roof structure. Thus, the bulk of the air flow delivery components are disposed to reduce conductive preheating from the roof structure on which they are supported whereby the pressurized cooling air flow delivered from the manifolds 80 to the passages 46 and thence into the muffle cavities 44 will accept transference thereto of heat energy at a higher rate per unit volume of air than obtainable in more conventional forehearth constructions.

The pressurized flow of air in the passages 46 enters the muffle cavity or chamber 44 through the air input bores 88 at a level and angle whereby continuous high-intensity air streams are laterally moving directly across the grooves and ridges of the panels 52. The air streams centrally converge in the long upper area of the muffle chamber 44 prior to exhaustion outwardly through the air exhaust openings 50. A cover block 51 is preferably disposed over each opening 50 and is utilized, by its position to the opening 50, to establish the rate of air flow exhaustion to the atmosphere.

In one advanced forehearth structure presently available to the industry, cooling air is moved through the cooling zone of a forehearth by means of a longitudinally-extending cavity contained within the roof structure which has an air inlet at one end and an air outlet spaced longitudinally therefrom whereby the air flow is either concurrent or countercurrent to the molten glass flow therebeneath. The temperature differential between the air entering the inlet and the structure defining the longitudinal passage is initially quite extreme but this differential quickly diminishes. The capacity of the air stream to absorb more heat energy diminishes significantly in relation to the distance traveled by the gradually warming air flow moving toward the exhaust end of the passage, adding to the complexity of the general problem of controlling temperature gradients throughout the forehearth.

The foregoing problem is directly addressed by the present invention which comprehends the provision of cool pressurized air being introduced transversely along both sides of the cavities or chambers 44, at spaced points along each cavity's full length. Moreover, the outboard longitudinally-extending manifold structures 80 serve as collecting tanks to assure the availability of relatively cool air immediately outward from each inlet to the chambers 44 whereby the temperature of the air stream entering the chambers at any inlet 88 therealong is substantially the same as any other selected inlet. The directional orientation of the inlets 88 to the chambers places the entering air streams in laterally-converging pathways across the grooves 74 and ridges 76 of the panels 52. The expanding air volume of heated air filling the chambers 44 is exhausted outwardly through the air exhaust openings 50, as shown in FIGS. 1 and 5.

Each exhaust opening 50 has, above it, a refractory block 51 which is preferably suspendably supported by an overhead suspension mechanism (not shown) to enable the block to be vertically adjusted relative to the opening 50.

From the foregoing description of the forehearth, in accordance with the present invention, it can be appreciated that a primary consideration in the structure is to physically separate the heating and cooling sub-systems of the forehearth. The glass along the two sides of the trough is typically cooler than the central glass portion, so the cooling function is concentrated on the central glass portion, and heat energy generation to the glass is confined to the glass along the trough sides and the trough sides. It is contemplated that, within the scope of the invention, the addition of a longitudinal central cooling channel through the trough body, already known in the art, could be added to further enhance the cooling capability of the forehearth. Moreover, independent temperature control means are contemplated which may include independent control of the burners for the two sides of the forehearth, along with controls separately regulating flue damper lifting mechanisms and the refractory block disposed at the air exhaust opening from each muffle chamber.

The benefits of the disclosed forehearth structure can be obtained regardless of the sophistication of the control system utilized. placement of appropriate thermal sensors at stategic points throughout the cooling zone will enable monitoring of the temperature at various points in the molten glass and the air flow channels whereby continuous adjustment of the heating and cooling sub-systems will maintain optimum temperatures, viscosity, and other pertinent characteristics of the glass within the forehearth.

The present invention has been described and illustrated in connection with a preferred embodiment, however, it is to be understood that other modifications and variations may be resorted to without departing from the spirit and scope of the invention, as those skilled in the art will readily understand. Such modifications and variations are considered to be within the purview and scope of the invention and the appended claims.

We claim:

1. A forehearth for conveyance and temperature control of molten glass, comprising:
   an elongated trough with a substantially wide floor portion and oppositely-disposed sidewalls for supporting the molten glass and longitudinally-extending firing chambers disposed adjacent each sidewall of the trough;
   a roof structure above the trough and defining, above the molten glass in the trough, at least one substantially large cooling area flanked by the longitudinally-extending firing chambers adjacent each sidewall of the trough;
   the roof structure having, at the upper end of the cooling area, a relatively thin heat-conductive, horizontally-disposed panel and an air passage cavity thereabove panel;
   the panel constituting part of the floor of the air passage cavity and acting to seal the cavity from the cooling area;
   air inlets defined in the roof structure to the sides of the cavity for conducting cooling air streams in merging lateral paths across an upper surface of the panel such that the air streams converge at the longitudinal center line of the cavity; and
   an opening defined in the roof structure outwardly along the top of the cavity for emitting the converged air to the atmosphere.

2. The forehearth of claim 1, further comprising air flow manifold means outboard the roof structure for providing pressurized air to the inlets in the sides of the cavity.

3. The forehearth of claim 1 wherein the air flow manifold means includes a pair of elongated manifold structures, and one of the pair extending longitudinally along each side of the roof structure.

4. The forehearth of claim 3 further including means insulating each of the air flow manifold structures from the cavity.

5. The forehearth of claim 4 wherein the insulating means comprises a longitudinally-extending air flow channel disposed inwardly from the manifold structure and generally between the manifold structure and the cavity, the manifold structure having longitudinally-spaced ports adapted to distribute pressurized air to the air flow channel, and the air inlets to the sides of the cavity being in flow communication with the air flow channel.

6. The forehearth of claim 1 wherein said firing chambers comprise:
   at least one burner block disposed outwardly adjacent each trough sidewall;
   the burner block having an opening therethrough and terminating inwardly in a diverging nozzle opening configuration;
   an outboard gas burner with an elongated nozzle projecting through the burner block opening;
   the nozzle being oriented to direct a high-intensity gas flame into the forehearth; and
   the inward lower edge of the burner block terminating laterally back from an inward edge of the trough sidewall.

7. The forehearth of claim 6 wherein the nozzle is angled downwardly to direct the high-intensity flame onto the surface of the molten glass and also against an upper surface of the trough sidewall, and the angle of the nozzle relative to horizontal being in a range of 7° to 13°.

8. The forehearth of claim 1 wherein the central cooling area is partially defined by spaced downward-jutting projections, each of the projections has a vertical flat surface defining one side of the cooling area, and the panel extends at least the full expanse between the vertical flat surfaces.

9. The forehearth of claim 8 wherein the upper end of each vertical flat surface is defined by a ledge for supporting the panel.

10. The forehearth of claim 1 wherein at least one of the surfaces of the panel is configured with linear parallel grooves to increase the exposed surface area of the panel.

11. The forehearth of claim 10 wherein the grooves are in the upwardly-facing surface of the panel and extend transversely to the forehearth, and the air inlets to the sides of the cavity are disposed in registration with the groove ends.

12. The forehearth of claim 1 wherein the cavity is upwardly defined by removable roof sections to permit access to and replacement of the panel.

13. The forehearth of claim 1 further including at least one flue in gas flow communication with each firing chamber, and means with the flue for regulating the outflow rate of gaseous products of combustion from each firing chamber.

14. The forehearth of claim 1 wherein a plurality of the cooling areas are disposed in spaced relation along the length of the trough so as to define a cooling zone.

15. The forehearth of claim 14 further comprising at least a pair of said cooling zones disposed successively along the length of the trough and separated by a solid baffle member having a lower edge parallel to and closely adjacent the surface of the molten glass in the trough.

* * * * *